US006992699B1

(12) United States Patent
Vance et al.

(10) Patent No.: US 6,992,699 B1
(45) Date of Patent: Jan. 31, 2006

(54) CAMERA DEVICE WITH SELECTABLE IMAGE PATHS

(75) Inventors: Scott L Vance, Cary, NC (US); Charles C Hunt, Raleigh, NC (US)

(73) Assignee: Telefonaktiebolaget LM Ericsson (publ), (SE)

( * ) Notice: Subject to any disclaimer, the term of this patent is extended or adjusted under 35 U.S.C. 154(b) by 1015 days.

(21) Appl. No.: 09/631,175

(22) Filed: Aug. 2, 2000

(51) Int. Cl.
*H04N 5/225* (2006.01)

(52) U.S. Cl. .................................. 348/207.99; 348/375

(58) Field of Classification Search ............. 348/14.01, 348/14.02, 14.05, 14.07, 14.08, 14.16, 207.99, 348/374, 375, 376; 359/212, 618, 872; 396/322, 396/429, 447; 455/550.1, 556.1, 557
See application file for complete search history.

(56) References Cited

U.S. PATENT DOCUMENTS

| | | | | |
|---|---|---|---|---|
| 4,303,322 A | | 12/1981 | Someya | 354/31 |
| 4,704,022 A | | 11/1987 | Nozawa et al. | 354/219 |
| 5,150,215 A | | 9/1992 | Shi | 358/209 |
| 5,491,507 A | * | 2/1996 | Umezawa et al. | 348/14.02 |
| 5,825,408 A | | 10/1998 | Yuyama et al. | |
| 5,940,126 A | * | 8/1999 | Kimura | 348/294 |
| 6,137,525 A | * | 10/2000 | Lee et al. | 348/14.02 |
| 6,177,950 B1 | * | 1/2001 | Robb | 348/14.01 |
| 6,339,508 B1 | * | 1/2002 | Nozawa et al. | 396/429 |
| 6,532,035 B1 | * | 3/2003 | Saari et al. | 348/14.02 |

FOREIGN PATENT DOCUMENTS

| | | |
|---|---|---|
| DE | 19736675 A1 | 2/1999 |
| WO | WO97/26744 | 9/1997 |
| WO | WO98/19435 | 5/1998 |

* cited by examiner

*Primary Examiner*—Thai Tran
*Assistant Examiner*—Luong T. Nguyen
(74) *Attorney, Agent, or Firm*—Coats & Bennett, P.L.L.C.

(57) ABSTRACT

A combination mobile terminal and camera with multiple light apertures in the housing. One aperture is disposed on a front side of the housing while another aperture is disposed on a rear side of the housing. The device has an image sensor disposed within the housing for converting images formed by light directed onto the image sensor into electrical signals. The device also has a movable optical system for selectively directing light passing through one of the light apertures onto the image sensor. The device also includes an image processor coupled to an output of the image sensor for processing the electrical signals from the image sensor to produce image signals. The device also has a position detector to detect the position of the movable optics and for directing the image processor to invert the images as needed.

42 Claims, 10 Drawing Sheets

CAMERA DEVICE WITH SELECTABLE IMAGE PATHS

BACKGROUND OF THE INVENTION

The present invention relates generally to camera devices and, more particularly, to a camera device having first and second selectable image paths.

Camera phones, which comprise a mobile, hand-held telephone and a digital camera in the same physical package, have recently been introduced to the market. At present, the development of digital camera phones is in its infancy. Wideband Code Division Multiple Access (WCDMA) and other emerging technologies will soon make it possible to send digital images and live video over wireless communication networks. These emerging technologies will spawn a new breed of camera phones that can be used for teleconferencing or for recording video that can be transmitted over the wireless communications network.

When recording video, the user generally likes to see the image being recorded. In modern video cameras, the image seen through the lens of the camera is presented on a liquid crystal display. The display is typically oriented to face the opposite direction of the lens so that the user can use the display as a viewfinder to view the image being recorded. However, when the user is participating in a video conference, a display facing in the same direction as the lens is needed so that the user can see the other parties while transmitting the user's own image. Modern video cameras solve this problem by mounting the display on a swivel so that it can be rotated to face in either direction. While it is technically feasible to make a display for a camera phone that can swivel, that is not a very practical solution for a camera phone. Color displays have numerous connections that would require use of a flexible connector. If a flexible connector is used, the display would need to swivel in one direction to move from position A to position B, and in the opposite direction to move back from position B to position A. Also the design of the flex is difficult to implement and is often unreliable.

SUMMARY OF THE INVENTION

The present invention relates to camera devices, such as a digital camera or camera phone, having first and second selectable image paths. The camera device comprises a housing having a first light aperture formed in a front side of the housing and a second light aperture formed in the back side of the housing. An image sensor is disposed within the housing for converting images formed by light on the image sensor into raw image data. The raw image data is processed by an image processor to produce formatted image signals for output to a display or for transmission by a transceiver. An optical system selectively directs light along either the first or second image paths onto the image sensor. In an exemplary embodiment, the optical system comprises a rotatable or slidable mirror assembly. When the rotatable mirror assembly is in a first position, light entering housing through the first light aperture is directed along the first image path to the image sensor. When the mirror assembly is in the second position, light entering through the second light aperture is directed along a second image path to the image sensor.

DETAILED DESCRIPTION OF THE PREFERRED EMBODIMENTS

Figure 1:
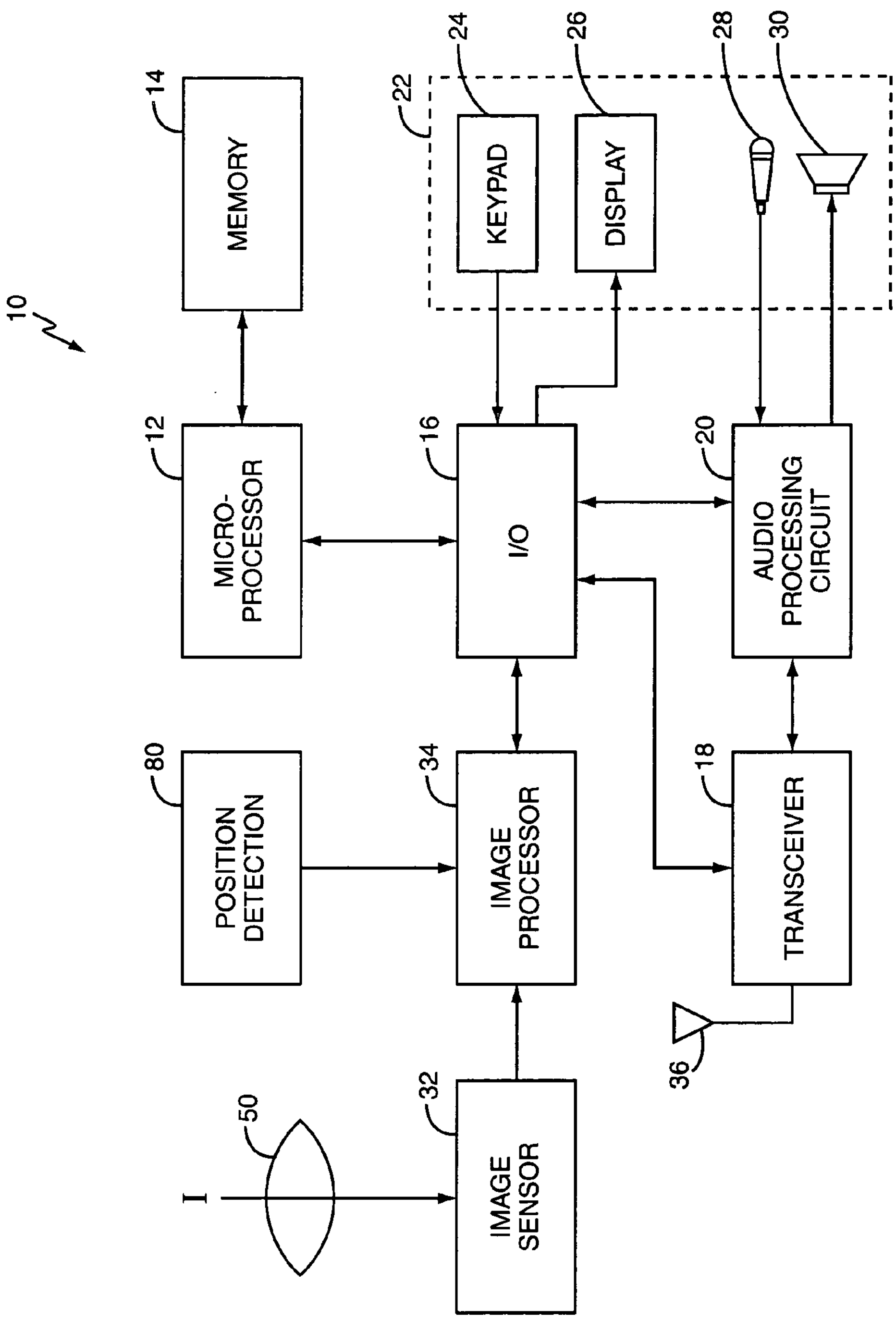
FIG. 1 is a block diagram of an exemplary camera device according to the present invention.

FIG. 1 is a block diagram of an exemplary camera device indicated generally by the numeral 10. The exemplary embodiment of the camera device comprises a camera phone, which is used as an example to describe one application of the invention. The present invention is not, however, limited to a camera phone. The present invention may be embodied in other camera devices including without limitation a digital camera, a mobile terminal, or other devices incorporating a camera. Mobile terminals may include cellular radiotelephones, personal communication services (PCS) devices, personal digital assistants (PDAs), laptop computers, and palm-top computers.

The camera phone 10 comprises a microprocessor 12, program memory 14, input/output circuit 16, transceiver 18, audio processing circuit 20, user interface 22, image sensor 32, image processor 34, and optical system 50. Microprocessor 12 controls the operation of the camera phone 10 according to programs stored in program memory 14. Input/output circuits 16 interface the microprocessor 12 with the user interface 22, transceiver 18, audio processing circuit 20, and image processing circuit 34. User interface 22 comprises a keypad 24, display 26, microphone 28, and speaker 30. Keypad 24 allows the operator to dial numbers, enter commands, and select options. The display 26 allows the operator to see dialed digits, call status, and other service information. Microphone 28 converts the user's speech into electrical audio signals, and speaker 30 converts audio signals into audible signals that can be heard by the user. Audio processing circuit 20 provides basic analog output signals to the speaker 30 and accept analog audio inputs from the microphone 28. Transceiver 18 is coupled to an antenna 36 for receiving and transmitting signals.

Image sensor 32 captures images formed by light impacting on the surface of the image sensor 32. The image sensor 32 may be any conventional image sensor 32, such as a charge-coupled device (CCD) or complementary metal oxide semiconductor (CMOS) image sensor. Image processor 34 processes raw image data collected by the image sensor 32 for subsequent output to the display 26 or for transmission by the transceiver 18. The image processor 34 is a conventional signal microprocessor programmed to process image data, which is well known in the art.

Figure 2:
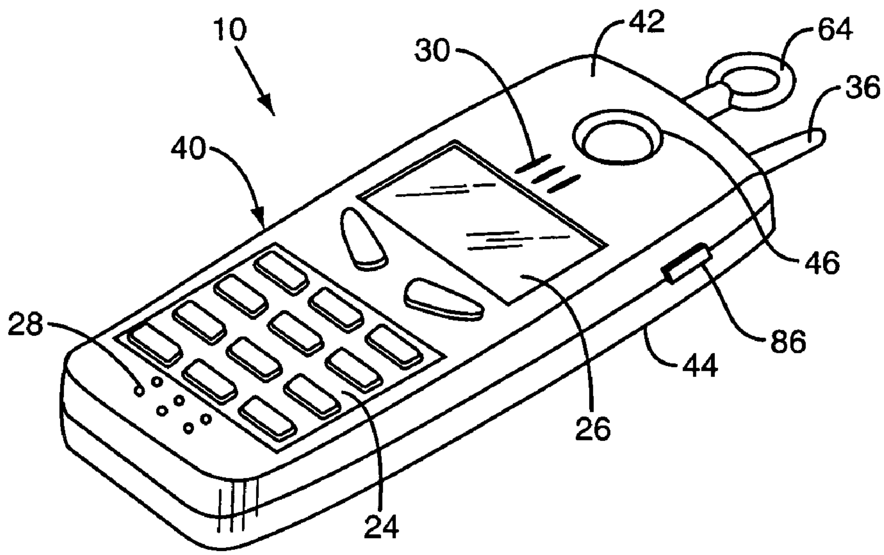
FIG. 2 is a perspective view of the camera device as seen from the front.
Figure 3:
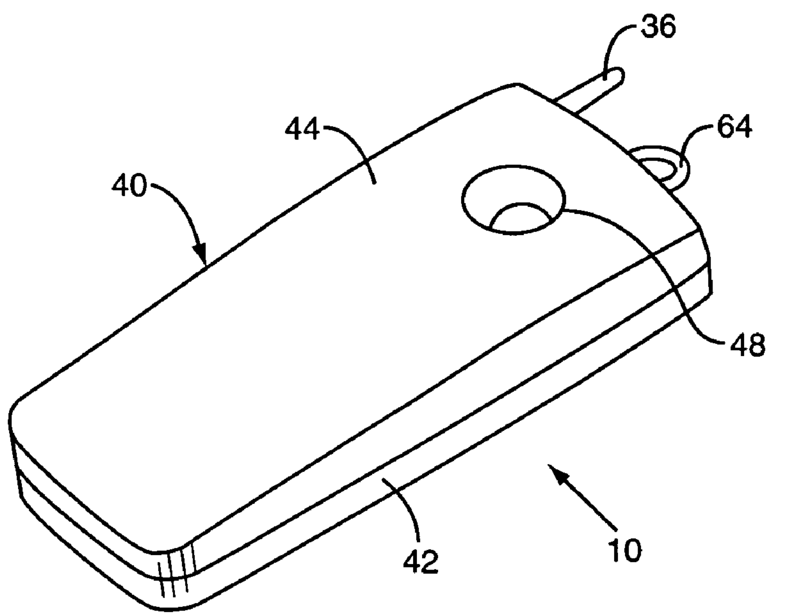
FIG. 3 is a perspective view of the camera device as seen from the back.

FIGS. 2 and 3 are perspective views illustrating an exemplary embodiment of the camera phone 10. The camera phone 10 includes a housing 40, which in the disclosed exemplary embodiment has a front cover 42 and a back cover 44. The keypad 24, display 26, microphone 28, and speaker 30 are disposed in the front cover 42. The front cover 42 further includes a first light aperture 46 disposed above the display 26, which faces in the same direction as the display 26. Back cover 44 includes a second light aperture 48, which faces in the opposite direction of the display 26. As will be described more fully below, the first and second light apertures 46, 48 allow the camera phone to look forwardly, e.g. the same direction as the display 26, or rearwardly, e.g. the opposite direction of the display 26.

Contained within housing 40 is a printed circuit board 38 which contains the electronic components of the camera phone 10 such as the microprocessor 12, memory 14, I/O circuits 16, transceiver 18, audio processing circuit 20, and image processing circuit 34. Image sensor 32 is also typically mounted to printed circuit board 38.

Figure 4:
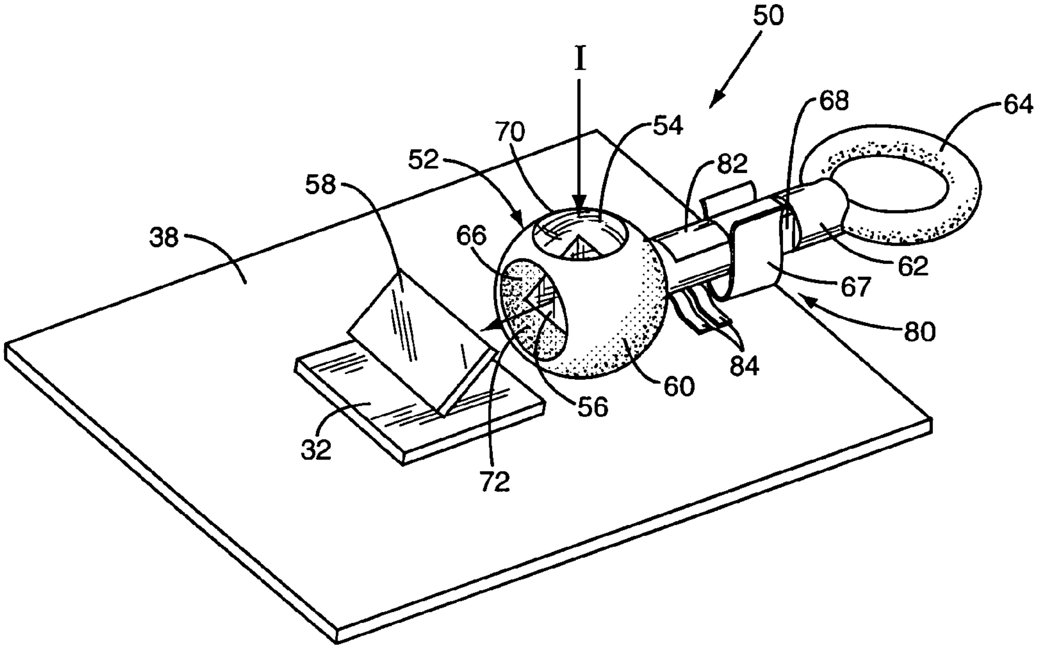
FIG. 4 is a perspective view showing one embodiment of a mirror assembly used in the camera device.

FIG. 4 is a perspective view illustrating the optical system 50 in the exemplary embodiment. The function of the optical system 50 is to selectively direct light along either a first image path or a second image path to the image sensor 32. The optical system 50 comprises an objective lens 54, a double-sided movable mirror 56, and a stationary mirror 58. The objective lens 54 and movable mirror 56 are part of a rotating mirror assembly 52. Mirror assembly 52 includes, in addition to the objective lens 54 and movable mirror 56, a spherical housing 60 mounted on a shaft 62. A ring 64 is disposed on the outer end of the shaft 62, which extends through the housing 40. Ring 64 provides a means for the user to rotate the mirror assembly 52. Those skilled in the art will recognize that the element for rotating the mirror assembly 52 may be located in the front, back, or sides of housing 40 and that a variety of different elements could be used. Mirror assembly 52 is held by a spring clip 67 that engages a pair of flat surfaces 68 on shaft 62 of the mirror assembly 52. The flat surfaces 68 function as an index mechanism to yieldably station the mirror assembly 52 at the forward-looking and rearward-looking positions as described more fully below.

Spherical housing 60 of mirror assembly 52 contains a cavity 66 having two openings—an entry opening 70 and exit opening 72. The axis of entry opening 70 is disposed perpendicular to the axis of shaft 62 so that the orientation of entry opening 70 changes when shaft 62 is rotated. The axis of exit opening 72 is coincident or parallel to the axis of shaft 62 so that exit opening 72 remains oriented in the same direction regardless of the angular position of shaft 62. Objective lens 54 is mounted within or adjacent the entry opening 70. Movable mirror 56 is positioned within cavity 66 so that light entering through entry opening 70 is reflected out through exit opening 72. Light reflected out of the mirror assembly 52 is then reflected by stationary mirror 58 onto the surface of the image sensor 32, which is mounted to the printed circuit board 38.

The rotating mirror assembly 52 allows the objective lens 54 and movable mirror 56 to move between at least first and second positions. Equivalently, the objective lens 54 and movable mirror 56 could be mounted for sliding movement between first and second positions. In the first position, shown in FIG. 5, light entering through the first light aperture 46 is directed along a first image path to the image sensor 32. In the second position, shown in FIG. 6, light entering through the second light aperture 48 is directed along a second image path to the image sensor 32.

Figure 5:
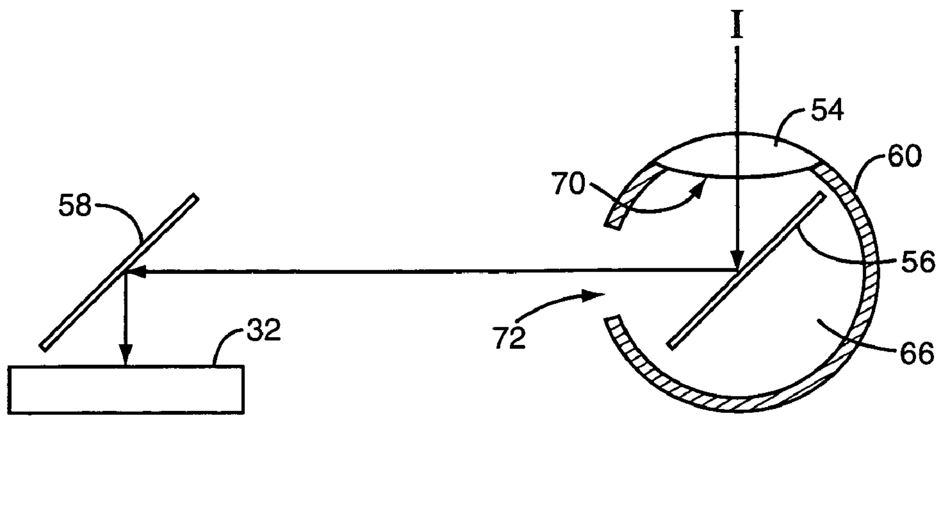
FIGS. 5 and 6 are schematic illustrations showing the mirror assembly in the forward-looking and rearward-looking positions respectively.
Figure 6:
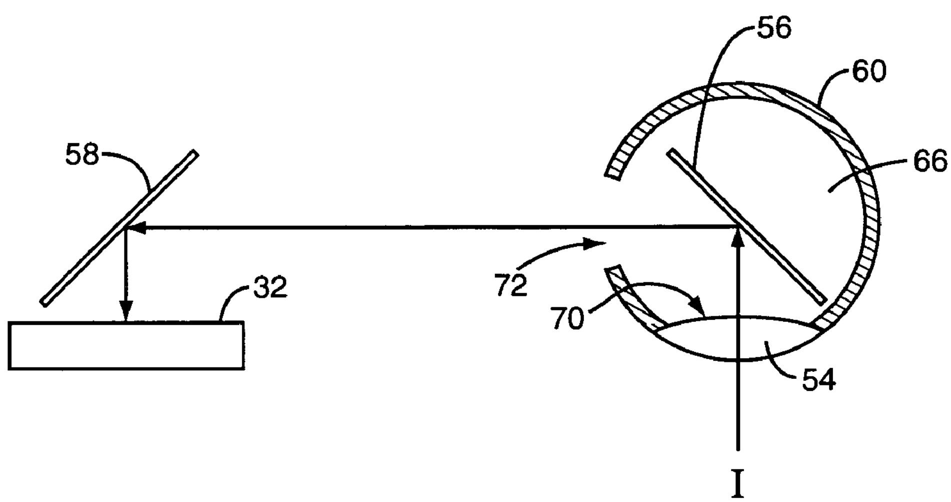

FIGS. 5 and 6 are schematic illustrations showing the operational positions of the mirror assembly 52. Light from an object is directed along either a first or second image path depending on the position of mirror assembly 52. Image sensor 32 picks up the reflected light and converts the reflected light to raw image data. The raw image data is processed by image processor 34 to provide an image signal which can be formatted for output to the display 26 or for transmission by the transceiver 18.

FIG. 5 illustrates the mirror assembly 52 in the forward-looking position. Light enters the housing 40 (not shown in FIGS. 5 and 6) through the first light aperture 46 and passes through the objective lens 54. Movable mirror 56 reflects the light through the exit opening 72 in the lens housing 60 in the direction of the stationary mirror 58. Stationary mirror 58 reflects light exiting lens housing 60 onto the image sensor 32. The path illustrated in FIG. 5 is referred to herein as the first image path.

In FIG. 6, the mirror assembly 52 is rotated 180° from the position shown in FIG. 5 to the rearward-looking position. In this position, light enters housing 40 through the second light aperture 48, passes through the objective lens 54, is reflected by movable mirror 56 through exit opening 72, and finally is reflected by stationary mirror 58 onto the image sensor 32. In this case, the image formed on the image sensor 32 will be inverted as compared to the image formed when the mirror assembly 52 is in the forward-looking position. A position sensor 80 detects the position of the mirror assembly 52 and generates a position signal that is input to the image processor 34. Based on the input from the position sensor 80, the image processor 34 inverts image so that the displayed image is correct.

A variety of different techniques can be used to detect the position of the mirror assembly 52. In the exemplary embodiment of FIG. 4, the position sensor 80 comprises a wiper contact 82 disposed on the shaft 62 of the mirror assembly 52. When the mirror assembly 52 is rotated to the rearward-looking position, the wiper contact 82 on the shaft 62 makes an electrical connection between two spaced-apart contacts 84 on the printed circuit board 38 and causes a signal to be generated indicative of the position of the mirror assembly 52. In this example, the signal is a voltage signal. Those skilled in the art will recognize that many other ways exist to detect position of the mirror assembly 52. Instead of a wiper contact 82, a mechanical switch actuated by rotation of the mirror assembly 52 could be used to determine the position of the mirror assembly 52. Also, there are many different types of non-contact position sensors 80 that can be used to detect the position of the mirror assembly 52, including capacitance sensors, inductance sensors, Hall-effect sensors, magnetic sensors, and optical sensors.

The camera phone 10 of the present invention can be used for video conferencing or as a conventional video camera. For teleconferencing, the mirror assembly 52 is oriented so that the lens faces forward, i.e., in the same direction as the display 26. In this orientation, the user's image is transmitted while the user talks on the camera phone 10. At the same time, the user can view the image being transmitted from the person at the other end of the call. To use the camera phone 10 as a video camera, the mirror assembly 52 is rotated to the rearward-looking position, i.e., facing away from the display 26. In this position, the user can use the camera phone 10 to record video images while using the display 26 as a viewfinder. In a preferred embodiment, a button 86 on the camera phone 10 allows the user to turn imaging system on and off.

Figure 7:
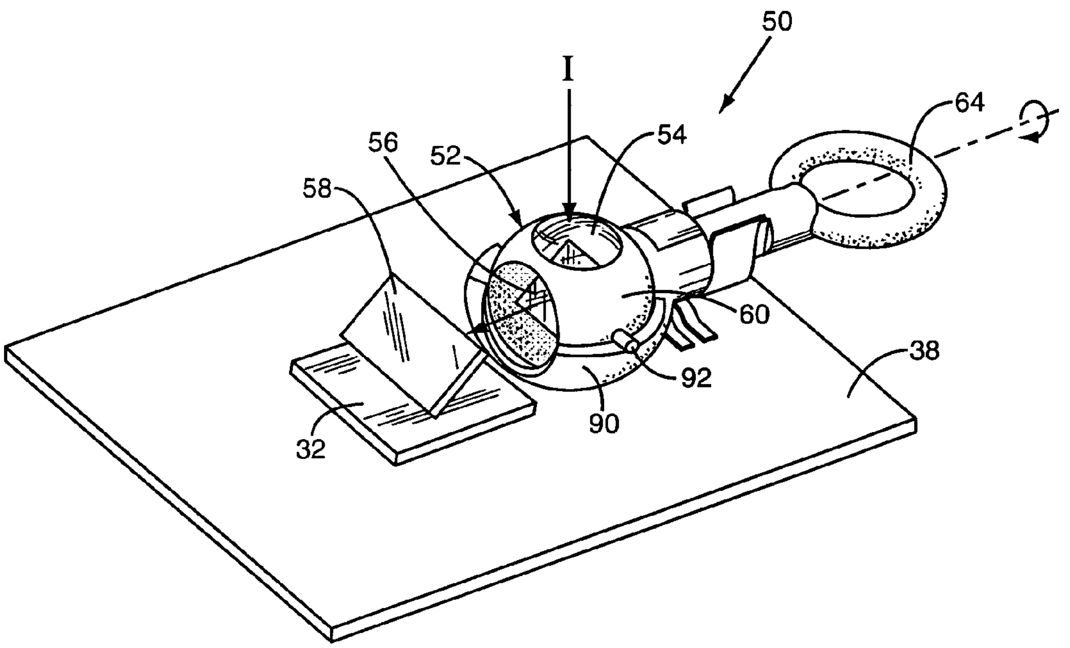
FIG. 7 is a perspective view showing an alternate embodiment of the mirror assembly including a lens cover.

FIG. 7 shows an alternate embodiment of the mirror assembly 52. The embodiment shown in FIG. 7 is identical to the embodiment of FIG. 4 but with the addition of a lens cover 90. Lens cover 90 serves to cover the objective lens 54 when not in use. Lens cover 90 is semi-spherical in form and conforms to the outer surface of spherical housing 60. A small pin 92 extends outward from the spherical housing 60. When the objective lens 54 is not in use, the mirror assembly 52 is rotated so that the objective lens 54 is covered by lens cover 90. The lens cover 90 can be rotated to cover either the first light aperture 46 or second light aperture 48. In FIG. 7, the lens cover 90 is covering the second light aperture 48. To move the lens cover 90 so as to conceal the first light aperture 46, the user rotates the mirror assembly 52 in either direction until pin 92 engages the edge of lens cover 90 and then continues to rotate the mirror assembly 52. Once pin 92 engages the lens cover 90, the lens cover 90 rotates with the remainder of the mirror assembly 52. The same procedure is followed to rotate the lens cover 90 back to the position shown in FIG. 7.

As an alternative to a rotating lens cover 90, the housing 40 of the camera phone 10 may include movable shutters or other covers. Also, a separate lens cover 90 or shutter can be eliminated by proper sizing of the entry opening 70. In this case, the mirror assembly 52 could be rotated such that the objective lens 54 faces sideways and the spherical housing 60 closes both light apertures 46 and 48.

Figure 8:
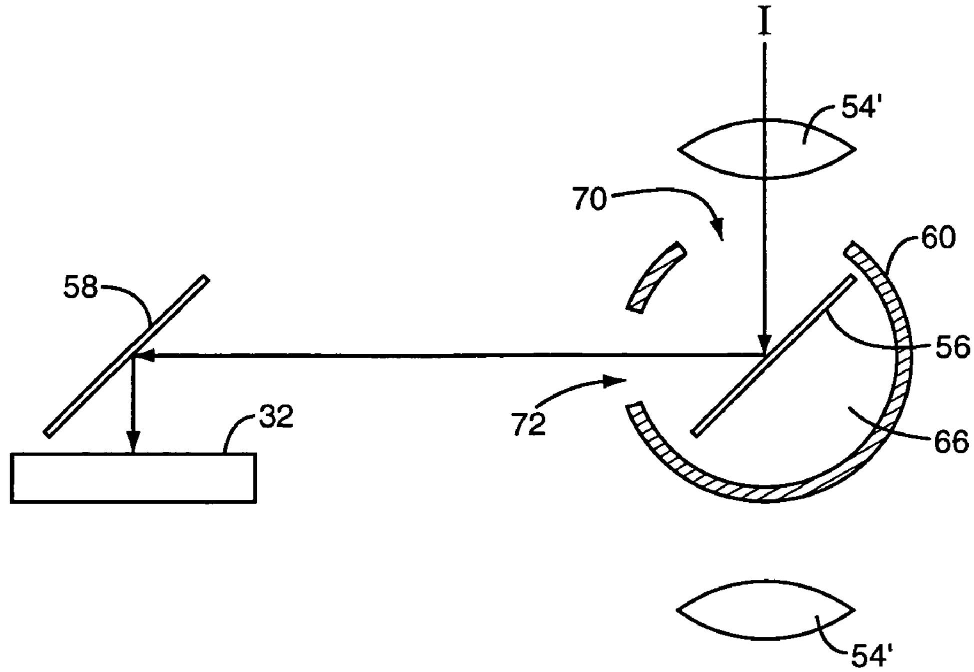
FIGS. 8 and 9 are schematic diagrams showing variation of the first embodiment of the camera device with two fixed lenses.
Figure 9:
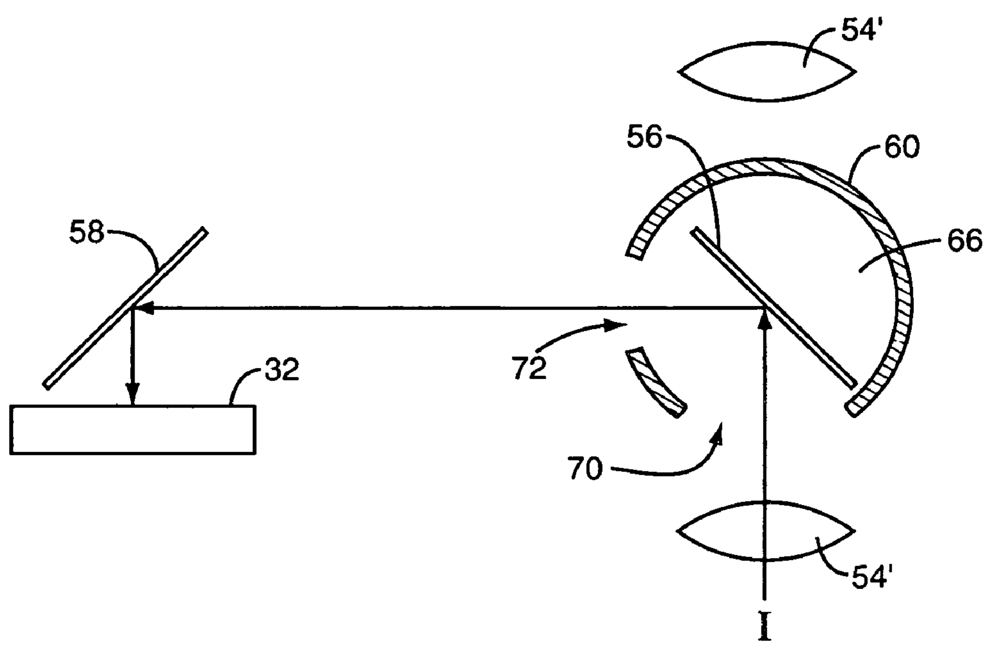

Those skilled in the art will appreciate that many other arrangements of lenses and mirrors are possible for carrying out the present invention. For example, the objective lens 54 in the mirror assembly 52 can be replaced by two stationary objective lenses 54'—one for each light aperture 46, 48—as shown in FIGS. 8 and 9. In this variant of the invention, the stationary lenses 54' are fixed. Additional lenses or mirrors could also be used. For example, a focusing lens or special effects lens could be included in the first or second image paths. Also, by positioning the image sensor 32 along the axis of the exit opening 72 of the mirror assembly 52, the stationary mirror 58 could be eliminated. In another variation, the objective lens 54 could be movable between at least first and second positions while using stationary reflecting mirrors.

It is also possible to replace the movable mirror 56 with a series of stationary mirrors and liquid crystal light valves as are commonly used in projection systems. The light valves could be used to selectively block or transmit light entering through the first and second light apertures by applying a voltage to the light valve which alters the transmission characteristics of the light valve. This would increase the total number of parts while eliminating movable parts. The light valves could be activated by a switch or button on the camera phone 10.

Thus, the particular arrangement of mirrors and lenses disclosed herein should not be construed as limiting the invention. The invention encompasses any arrangement of mirrors, lenses, light valves, or other components which allow light to be selectively directed along a plurality of image paths to an image sensor.

Figure 10:
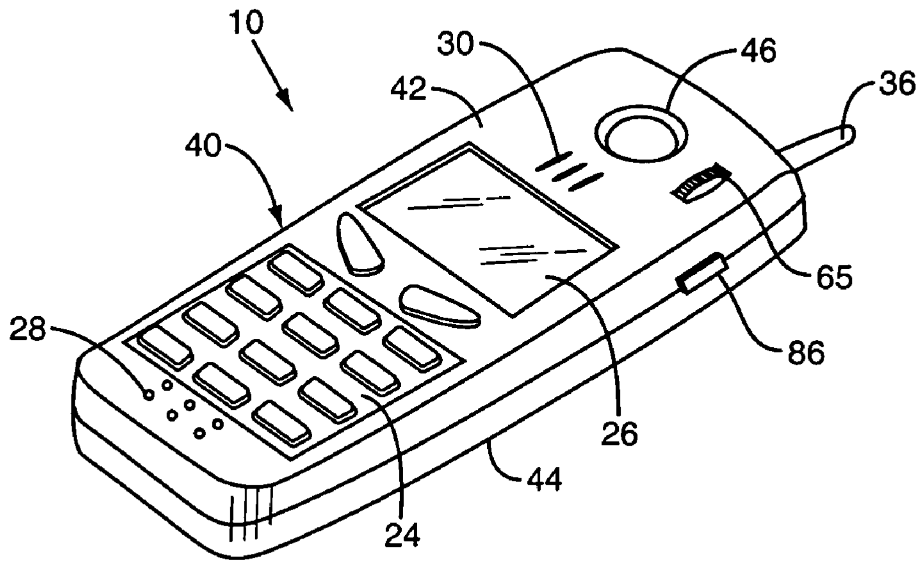
FIG. 10 is a perspective view showing a second exemplary embodiment of the camera device.
Figure 11:
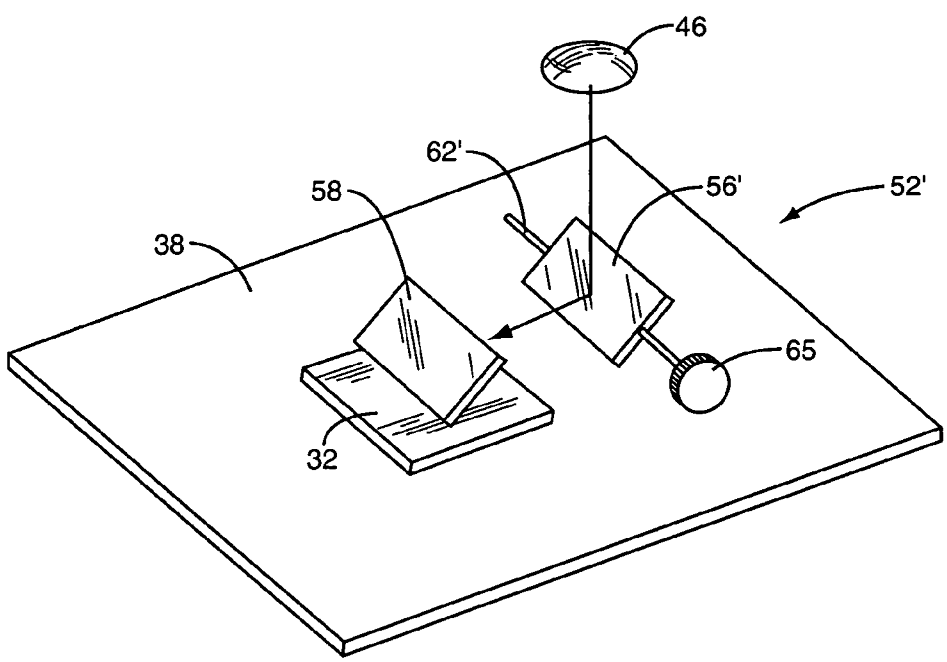
FIG. 11 is a perspective view showing the mirror assembly used in the second embodiment of the camera device.

FIG. 10 is a perspective view illustrating a second embodiment of the camera phone 10 of the present invention. The camera phone 10 of FIG. 10 is similar to the embodiment of FIGS. 1–9 and, therefore, similar reference numbers are used to indicate similar parts. In the embodiment shown in FIG. 10, a dial 65 is disposed in the front cover 42 of the camera phone 10. Dial 65 is part of a mirror assembly 52' shown in FIG. 11. Mirror assembly 52' includes a shaft 62' and a double-sided reflecting mirror 56'. Dial 65 is connected to one end of shaft 62'. Reflecting mirror 56' is mounted on shaft 62' so as to rotate with shaft 62'. Dial 65 is turned by the user's thumb to rotate the reflecting lens 56' between the first and second positions.

Figure 12:
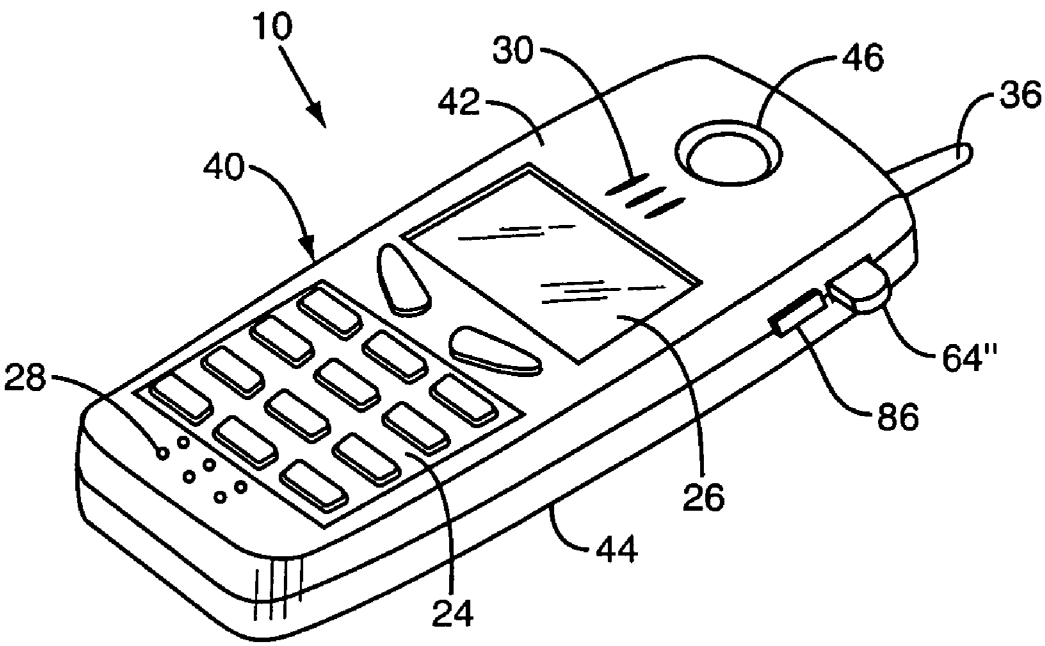
FIG. 12 is a perspective view showing a third exemplary embodiment of the camera device.
Figure 13:
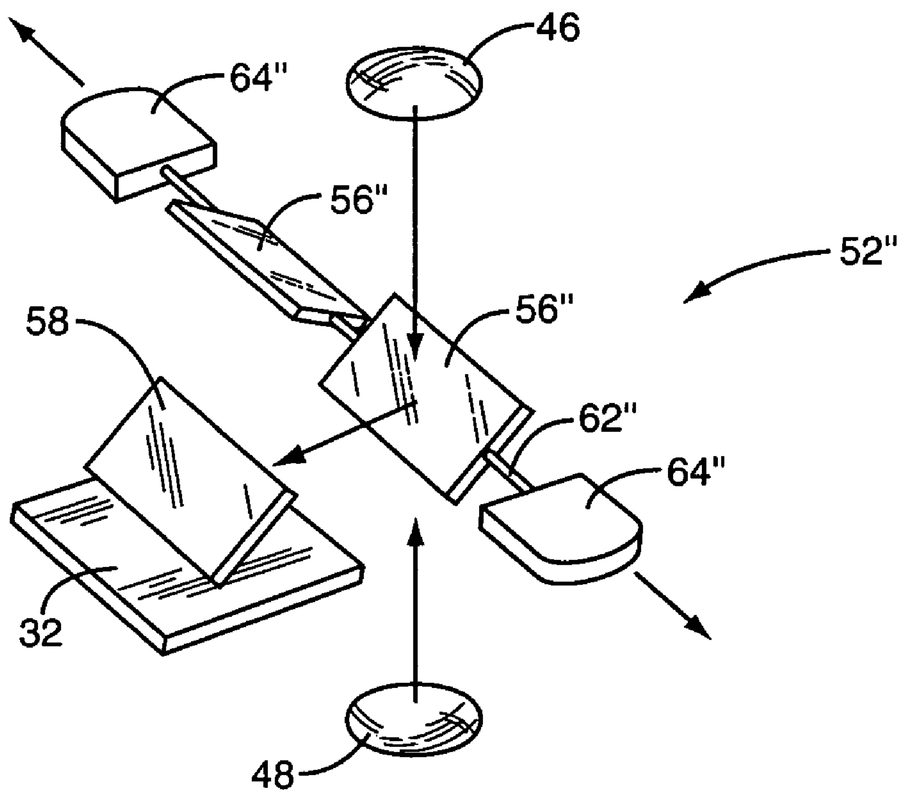
FIG. 13 is a perspective view showing the mirror assembly used in the third embodiment of the camera device.

FIG. 12 is a perspective view of a third embodiment of the camera phone 10. This embodiment is similar to the previous embodiments and, therefore, similar reference numbers are used to indicate similar parts. In the embodiment of FIG. 13, a sliding mirror assembly 52" is used in place of the rotating mirror assembly 52 and 52' of the previous embodiments. Mirror assembly 52" comprises a shaft 62" with a thumb pad 64" at each end thereof and a pair of single-sided reflecting mirrors 56". The single-sided reflecting mirrors 56" are mounted to the shaft 62". Reflecting mirrors 56" are disposed at a 90° angle with respect to one another. The mirror assembly 52" slides along the axis of the shaft 62" as indicated by the arrows in FIG. 13 to selectively position the reflecting mirrors 56" in the first and second optical paths, respectively.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A combination mobile terminal and camera comprising:

a housing having a first light aperture formed in a first side of said housing and a second light aperture formed in a second side of said housing;

a wireless transceiver disposed within said housing for transmitting and receiving signals;

an image sensor fixedly disposed within said housing for converting images formed by light on said image sensor into electrical signals;

a movable optical system for selectively directing light passing through said first and second light apertures onto said image sensor; and an image processor coupled to an output of said image sensor for processing the electrical signals from said image sensor to produce image signals.

2. The combination mobile terminal and camera of claim 1 wherein said optical system comprises a mirror assembly having at least one movable mirror, said mirror assembly being movable between a first position to direct light entering through said first light aperture along a first image path onto said image sensor and a second position to direct light entering through said second light aperture along a second image path onto said image sensor.

3. The combination mobile terminal and camera of claim 2 wherein said mirror assembly comprises at least one movable mirror rotatable between at least first and second positions.

4. The combination mobile terminal and camera of claim 3 wherein said movable mirror directs light entering through said first light aperture along said first image path onto said image sensor when disposed in the first position and directs light entering through said second light aperture along said second image path onto said image sensor when disposed in the second position.

5. The combination mobile terminal and camera of claim 2 wherein said mirror assembly comprises at least first and second movable mirrors.

6. The combination mobile terminal and camera of claim 5 wherein said first and second movable mirrors slide between the first position and the second position.

7. The combination mobile terminal and camera of claim 5 wherein said first movable mirror directs light entering through said first light aperture along said first image path onto said image sensor when said first and second movable mirrors are disposed in said first position and wherein said second movable mirror directs light entering through said second light aperture along said second image path onto said image sensor when said first and second movable mirrors are disposed in said second position.

8. The combination mobile terminal and camera of claim 2 further comprising a position detector to detect the position of said mirror assembly, said image processor being responsive to a signal from said position detector to invert said images when said mirror assembly is in one of said first and second positions.

9. The combination mobile terminal and camera of claim 1 wherein said optical system further comprises at least one lens.

10. The combination mobile terminal and camera of claim 9 wherein said lens is movable between a first position along a first image path to a second position along a second image path.

11. The combination mobile terminal and camera of claim 10 further comprising a movable mirror assembly having at least one movable mirror, said mirror assembly being movable between the first position to direct light entering through said first light aperture along said first image path onto said image sensor and the second position to direct light entering through said second light aperture along said second image path onto said image sensor.

12. The combination mobile terminal and camera of claim 9 comprising a first lens disposed along said first image path and a second lens disposed along said second image path.

13. The combination mobile terminal and camera of claim 12 wherein said first and second lenses are fixed.

14. The combination mobile terminal and camera of claim 1 further comprising a display.

15. The combination mobile terminal and camera of claim 10 wherein said first light aperture faces in the direction of a display and said second light aperture faces in the direction opposite said display.

16. A camera comprising:

a housing;

a display mounted in said housing;

a first light aperture formed in a first side of said housing and facing in the direction of said display;

a second light aperture formed in a second side of said housing and facing in a direction opposite said display;

an image sensor fixedly disposed within said housing for converting images formed by light on said image sensor into electrical signals;

a movable optical system for selectively directing light passing through said first and second light apertures onto said image sensor; and an image processor coupled to an output of said image sensor for processing the electrical signals from said image sensor to produce image signals.

17. The camera of claim 16 wherein said optical system comprises a mirror assembly having at least one movable mirror, said mirror assembly being movable between a first position to direct light entering through said first light aperture along a first image path onto said image sensor and a second position to direct light entering through said second light aperture along a second image path onto said image sensor.

18. The camera of claim 17 wherein said mirror assembly comprises at least one movable mirror rotatable between at least first and second positions.

19. The camera of claim 18 wherein said movable mirror directs light entering through said first light aperture along said first image path onto said image sensor when disposed in said first position and directs light entering through said second light aperture along said second image path onto said image sensor when disposed in said second position.

20. The camera of claim 17 wherein said mirror assembly comprises at least first and second movable mirrors.

21. The camera of claim 20 wherein said first and second movable mirrors slide between a first position and a second position.

22. The camera of claim 20 wherein said first movable mirror directs light entering through said first light aperture along said first image path onto said image sensor when said first and second movable mirrors are disposed in said first position and wherein said second movable mirror directs light entering through said second light aperture along said second image path onto said image sensor when said first and second movable mirrors are disposed in said second position.

23. The camera of claim 22 further comprising a position detector to detect the position of said mirror assembly, said image processor being responsive to a signal from said position detector to invert said images when said mirror assembly is in one of said first and second positions.

24. The camera of claim 16 wherein said optical system further comprises at least one lens.

25. The camera of claim 24 wherein said lens is movable between a first position along a first image path to a second position along a second image path.

26. The camera of claim 25 further comprising a movable mirror assembly having at least one movable mirror, said movable mirror assembly being movable between the first position to direct light entering through said first light aperture along said first image path onto said image sensor and the second position to direct light entering through said second light aperture along said second image path onto said image sensor.

27. The camera of claim 24 comprising a first lens disposed along a first image path and a second lens disposed along a second image path.

28. The camera of claim 27 wherein said first and second lenses are fixed.

29. A method for selectively displaying images seen through first and second apertures of a camera facing in opposing directions, said method comprising:

providing a movable mirror assembly for selectively directing light entering through said first and second apertures onto an image sensor to capture an image;

positioning said movable mirror assembly in a first position to direct light entering through said first light aperture along a first image path to capture an image seen through said first light aperture; and positioning said movable mirror assembly in a second position to direct light entering through said second light aperture along a second image path to capture an image seen through said second light aperture.

30. The method of claim 29 wherein said movable mirror assembly comprises a movable mirror and wherein positioning said movable mirror assembly in said first and second positions comprises moving said mirror between said first and second positions.

31. The method of claim 30 wherein said movable mirror is rotatable and wherein moving said movable mirror between said first and second positions comprises rotating said movable mirror between said first and second positions.

32. The method of claim 30 wherein moving said movable mirror between said first and second positions comprises sliding said movable mirror between said first and second position.

33. A method of directing multiple images through multiple apertures onto an image sensor comprising:

positioning a movable mirror assembly in a first position:

recording a first image by directing the first image through a first aperture onto the movable mirror assembly;

reflecting the first image from the mirror assembly disposed in the first position to direct the reflected first image onto the image sensor;

positioning the movable mirror assembly from the first position to a second position;

recording a second image by directing the second image through a second aperture onto the movable mirror assembly; and reflecting the second image from the mirror assembly disposed in the second position to direct the reflected second image onto the image sensor.

34. The method of claim 33 wherein the mirror assembly includes a single mirror, and wherein the first and second images are reflected from the single mirror onto the image sensor.

35. The method of claim 34 wherein the single mirror is movable between the first and second positions, and wherein in the first position said single mirror aligns with said first aperture, and wherein in said second position said single mirror aligns with said second aperture.

36. The method of claim 35 wherein said single mirror is rotatable between said first and second positions.

37. The method of claim 33 wherein said mirror assembly includes first and second mirrors movable between the first and second positions, and wherein in said first position said first mirror aligns with said first aperture, and wherein in said second position said second mirror aligns with said second aperture.

38. A combination mobile terminal and camera comprising:

a housing;

a wireless transceiver disposed within the housing for transmitting and receiving signals;

an image sensor fixedly disposed within the housing for converting images formed by light directed on the image sensor into electrical signals;

a movable optical system for selectively directing light entering the housing from a first and a second direction onto the image sensor; and an image processor coupled to an output of the image sensor for processing the electrical signals from the image sensor to produce image signals.

39. The combination mobile terminal and camera of claim 38 wherein the optical system selectively directs light entering the housing through one of two apertures in the housing.

40. The combination mobile terminal and camera of claim 38 wherein the optical system selectively directs light entering the housing through a first aperture located in the front of the housing and a second aperture located in the rear of the housing.

41. The combination mobile terminal and camera of claim 38 wherein the optical system for selectively directing light comprises a first and second movable mirrors slidable between a first position and second position to selectively direct light entering the housing onto the image sensor.

42. The combination mobile terminal and camera of claim 38 wherein the optical system comprises at least one movable component that is movable between two positions to selectively direct light entering the housing onto the image sensor and further comprising a position detector to detect the position of the movable component, the image processor being responsive to a signal from the position detector to invert the images when the movable component is in one of the two positions.

* * * * *